H. H. MERCER.
STONEWORKING MACHINE.
APPLICATION FILED DEC. 11, 1909.

1,228,040.

Patented May 29, 1917.
4 SHEETS—SHEET 1.

Fig. 1.

Witnesses:
Ernest A. Telfer
Carl L. Choate

Inventor:
Henry H. Mercer
by Emery Booth
Att'ys.

H. H. MERCER.
STONEWORKING MACHINE.
APPLICATION FILED DEC. 11, 1909.

1,228,040.

Patented May 29, 1917.
4 SHEETS—SHEET 4.

Fig. 7.

Witnesses:
Ernest A. Telfer
Carl L. Choate.

Inventor:
Henry H. Mercer
by Emery Booth
Attys.

UNITED STATES PATENT OFFICE.

HENRY H. MERCER, OF CLAREMONT, NEW HAMPSHIRE, ASSIGNOR, BY MESNE ASSIGNMENTS, TO SULLIVAN MACHINERY COMPANY, OF BOSTON, MASSACHUSETTS, A CORPORATION OF MASSACHUSETTS.

STONEWORKING-MACHINE.

1,228,040.        Specification of Letters Patent.      Patented May 29, 1917.

Application filed December 11, 1909. Serial No. 532,574.

*To all whom it may concern:*

Be it known that I, HENRY H. MERCER, a citizen of the United States, and a resident of Claremont, county of Sullivan, State of New Hampshire, have invented an Improvement in Stoneworking-Machines, of which the following description, in connection with the accompanying drawings, is a specification, like letters on the drawings representing like parts.

This invention relates to stone working machines, the purpose thereof being to increase the efficiency and extend the utility of such machines.

This invention as to many of its important features may be applied to various purposes and to stone working machines of widely different types, and to machines widely different from the one herein described. For purposes of illustration, however, it is here shown as applied to a stone channeling machine constructed as a track channeler useful for cutting not only the usual channel groove, but also for corner cutting, for wall cutting, and for various other purposes.

My invention will be best understood by reference to the following description when taken in connection with the accompanying illustration of one specific embodiment thereof, while its scope will be more particularly pointed out in the appended claims.

Referring to the drawings and to the embodiment of the invention there submitted for illustrative purposes, I have shown a stone working machine, here in the form of a track channeler supported upon a carriage or framework 1. The latter is provided at its opposite ends with two transverse shafts or axles 2, each carrying near its outer end flanged truck wheels 3 which are adapted to run upon the rails 4, the latter being customarily laid upon the quarry bottom to permit the advance of the machine when cutting in the usual fashion.

The machine is provided with suitable cutting appliances and with actuating means therefor, being herein equipped for that purpose with a tool or tools of the percussive type. Any suitable cutting appliances may be employed, but herein there is utilized a reciprocatory cutting tool associated with a compressed air, direct-acting engine, the latter supplied with pressure fluid from a suitable source (not shown) and having the cylinder 5 with its coöperating piston to which latter is connected the piston rod 6 and the cross head 7 (shown in dotted lines Fig. 3). The latter has clamped thereto a suitable tool or tools such as the gang 8 of three channeling tools, the cutting ends of the latter being given a reciprocatory cutting movement toward and from the bottom of the channel groove as the engine piston is reciprocated. The cross head 7 reciprocates within cross head guide 9 (Fig. 3), the latter being provided with gibs 10 which overlie the cross head, and being rigidly connected to the cylinder 5 to form therewith an actuator frame or carrier adjustable as a unit toward or from the work.

The sliding actuator frame, which includes the tool actuating engine and cross head guides, together with the supported cross head and attached tools, is guided during its sliding movement upon a standard or intermediate support 11, which latter presents finished webs or guide ways 12 (Figs. 3 and 7) to receive the inner finished face of the frame, gibs 13 being secured to the frame to overlie the inner edges of the said webs and retain the sliding frame thereon.

The standard or intermediate support 11 is secured to a swinging carrier or oscillatory frame 14, by connections which herein permit, when desired, of a periodic movement by the standard and its cutting appliances toward and from the work. The swinging carrier may be held fixed during the cutting operation or be given a swinging movement to swing the cutting appliances lengthwise the channel groove as well. In the illustrated form of machine the oscillatory frame consists of a plate circular in form and supported at the active or cutting side of the truck. The intermediate support or standard is guided for sliding movement along the said frame 14 by means of the overlying gibs 15 which extend across the plate and are bolted thereto. These gibs overlie finished webs 16 on the standard and abut against raised shouldered portions 117 on the plate so that the standard is kept in a secure alinement at all times, being movable toward or from the work, under certain conditions, by devices which will be more fully described.

Figures 3, 4, 5, 6:
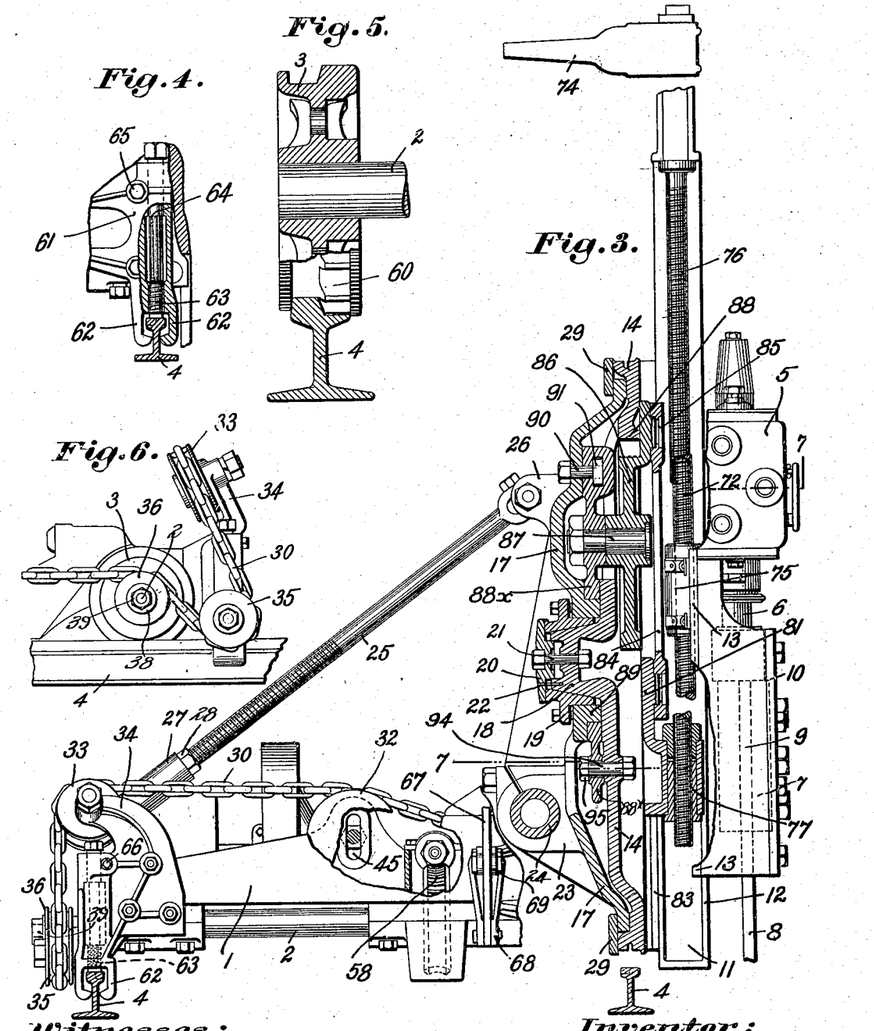
Fig. 3 is an end elevation partially in section of the channeling machine shown in Fig. 1.
Fig. 4 is a detail in elevation and partial section showing the construction of rail clamp.
Fig. 5 is a sectional elevation in detail of one of the truck driving wheels.
Fig. 6 is a rear elevation of the guiding sheaves for the tool-swinging cable chain.

To provide for the swinging movement of the standard and the tool actuating devices lengthwise the channel groove when the machine is employed for corner cutting, wall cutting, or the like, the plate 14 is mounted to swing through any desired arc on the main supporting frame 17, which latter is mounted at the side of the machine as shown in Fig. 3. The plate 14 (see Fig. 3) has the centrally formed trunnion 18 journaled in a bearing block 19, the latter bolted to the frame 17. The trunnion has a tapered seat in the said bearing so that the plate may be adjustable in its bearing, the plate being held in position by means of the cap 20 fastened to the trunnion by the bolt 21 and prevented from turning thereon by the pin 22.

For angle cutting the main frame support 17 has a swinging adjustment about an axis lengthwise the channel groove, there being provided for this purpose (Fig. 3) at its back brackets 23 by which it may be fixedly and adjustably clamped to the trunnion shaft 24, the latter fixedly held at its end of the carriage frame 1 by the cap pieces 125.

The supporting frame 17 is held during cutting at any desired inclination by means of the inclined brace rods 25 which latter have a swivel connection each at its upper end to a lug 26 on the back of the main frame 17 and, at its lower end, is connected to a sleeved bracket 27 adjustably bolted to a seat upon the main frame 1. The lower end of the threaded brace rod passes entirely through the sleeve of the bracket and is secured thereto by means of check nuts 28, so that its length may be adjusted to permit the desired inclination of the supporting frame.

For swinging the carrier and the cutting appliances during corner cutting, the circumferential edge walls of the oscillating plate overlie the circumferential edge of the main support and the overlying part of the plate is provided with gibs 29, the latter overlying the back edge of the supporting frames so that the plate may be turned upon its central trunnion through any desired angle while held securely guided and alined by means of the frame.

Any suitable means may be provided for reciprocatively swinging the cutting appliances, but herein the swinging plate is turned through direct engagement of a driving member with the circumferential edge thereof, such driving member in the present case consisting of a flexible cable chain 30 (Fig. 1) passing over and about the uppermost half of the plate. The flanged edge of the latter is preferably grooved and toothed (Fig. 7) to receive the cable chain so that the plate constitutes, in effect, a large sprocket wheel. At each side of the plate the driving chain passes down and about the guide sprocket wheel 31 journaled upon the trunnion shaft, thence up and over the intermediate idle sprocket wheel 32 journaled at each end of the carriage 1, and thence to the somewhat inclined sprocket wheel 33, the latter journaled upon a bracket 34 clamped on to each rail corner of the machine. From the guiding sprocket wheels 33 the chain passes downward (Fig. 6) at the rear of the machine and to the under side of the two idle guide sheaves 35 and thence to the upper side of the two toothed driving sprocket wheels 36, the latter carried by and fixedly secured to the end of the driving axles 2.

Figure 7:
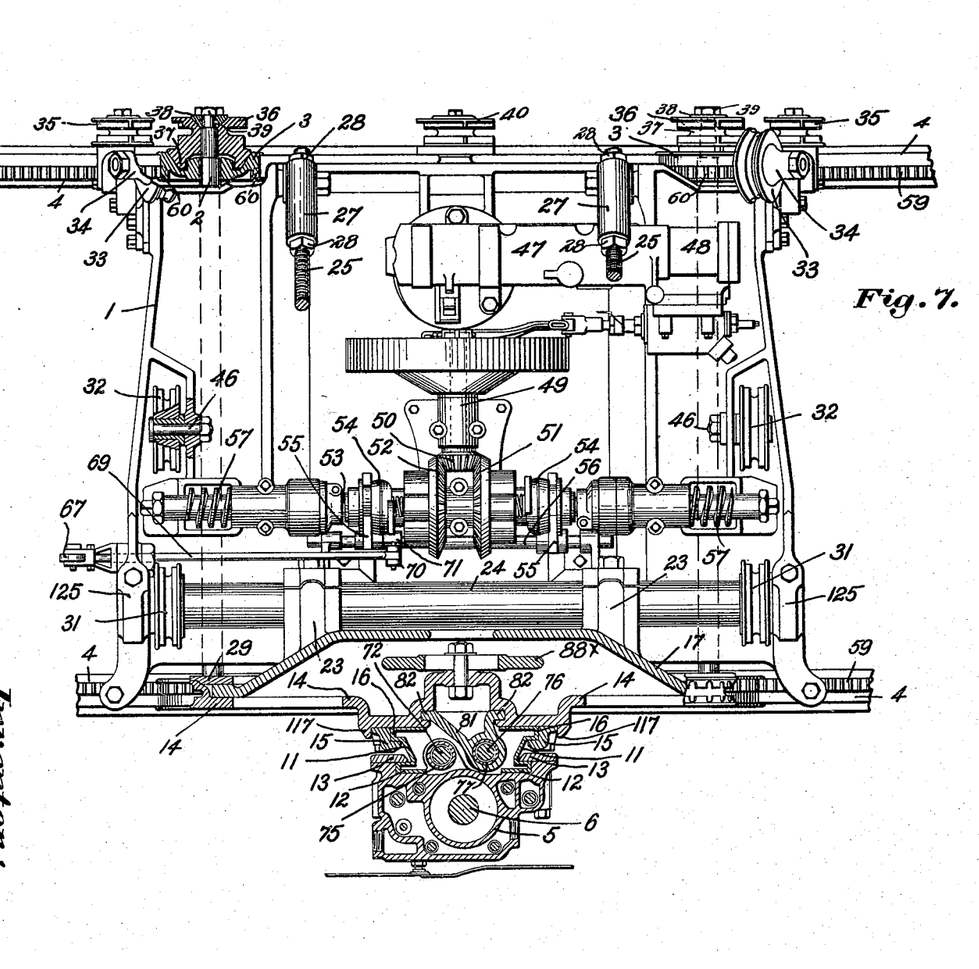
Fig. 7 is a sectional plan of the machine shown in Fig. 1, such section being taken on the line 7—7 in Fig. 3.

Each of the driving sprocket wheels 36, as shown in Fig. 7, is mounted to turn freely upon a reduced end of the axle, but is provided with a cone-shaped friction portion 37 adapted to engage the correspondingly shaped walls of the adjacent truck wheel 3. On the end of the axle there is keyed a cone-shaped washer 38 adapted to seat in the outer face of the sprocket wheel, and there is also provided the clamping nut 39 by means of which the sprocket wheel may be forced into frictional engagement with the truck wheel, this serving to clamp the sprocket wheel to the axle or free the same therefrom so as operatively to connect the driving chain 30 to or disconnect the same from the driving axles. Between the driving sprocket wheels 36 there is an intermediate guiding sprocket wheel 40 under which the chain passes so that the latter is held in good contact with the upper side of the driving sprocket wheels 36. When the truck driving mechanism is operated and the truck axles turned, the chain may be driven from the driving sprocket wheels 36 and the cutting appliances caused to swing through the arc of a circle.

Suitable means may be employed for tightening or loosening the driving chain, the same being herein provided for by changing the position of one or more of the idle or guiding sprocket wheels, as for example, the sprocket wheels 32, which for this purpose are adjustably clamped in an elongated slot 45 in the machine frame 1 by means of the clamping stud 46.

Obviously other means for swinging the tools may be employed, if desired, the selected form of apparatus being herein shown for the purposes of illustration merely.

Any suitable means may be employed for imparting driving movement to the axles, but herein I have shown a fluid pressure engine 47 (Fig. 7) provided with a cylinder 48 and connected to turn a transverse driving shaft 49. The latter carries at its end the beveled pinion 50 which imparts equal but opposite rotation to the two beveled gears 51 and 52. These may be separately clutched to or unclutched from the clutching shaft 53 by the sliding movement of the double clutch member 54—54. The movement of the latter is effected through the pair of yoke-shaped arms 55 each embracing a circumferential groove of its corresponding clutch member 54 and being pinned or otherwise secured to the reversing, sliding rod 56 which is mounted on brackets upon the carriage frame for sliding movement parallel with the clutch shaft 53. In one position the rod clutches the gear 51 to the clutch shaft to turn the latter in one direction, but, when shifted to its opposite position, it clutches the gear 52 to the said shaft to turn the latter reversely.

The carriage may be traversed with the cutting appliances held at a fixed position on the support for the ordinary channel cut, or may be traversed, if desired, while the cutting appliances are undergoing swinging movement, the necessary traversing movement in either case being imparted to the carriage through the clutch shaft 53. For this purpose the latter carries at each end a worm 57, the latter meshing (Fig. 3) with an underlying worm gear 58 geared or otherwise secured to the carriage axle 2. The carriage therefore may be moved under its own power in either direction according to the position of the clutch 54.

In order to provide positive driving means for advancing the truck when the tools are held at an extreme forward inclination, or to provide, when desired, against slippage due to any other cause, toothed or other positive driving connections are preferably employed between the truck and the guiding rails. Herein such connections are provided by forming teeth upon the truck wheels adapted to engage the teeth of a rack formed in the rails, or otherwise presented by the trackway. For this purpose one side of the face of one or both sets of rails is provided with appropriately formed teeth 59 constituting a rack, and a part of the track-engaging periphery of each truck wheel is provided with gear teeth 60 (see Fig. 5) which mesh with the teeth of the rack and serve positively to propel or hold the carriage without danger of slippage.

Figure 1:
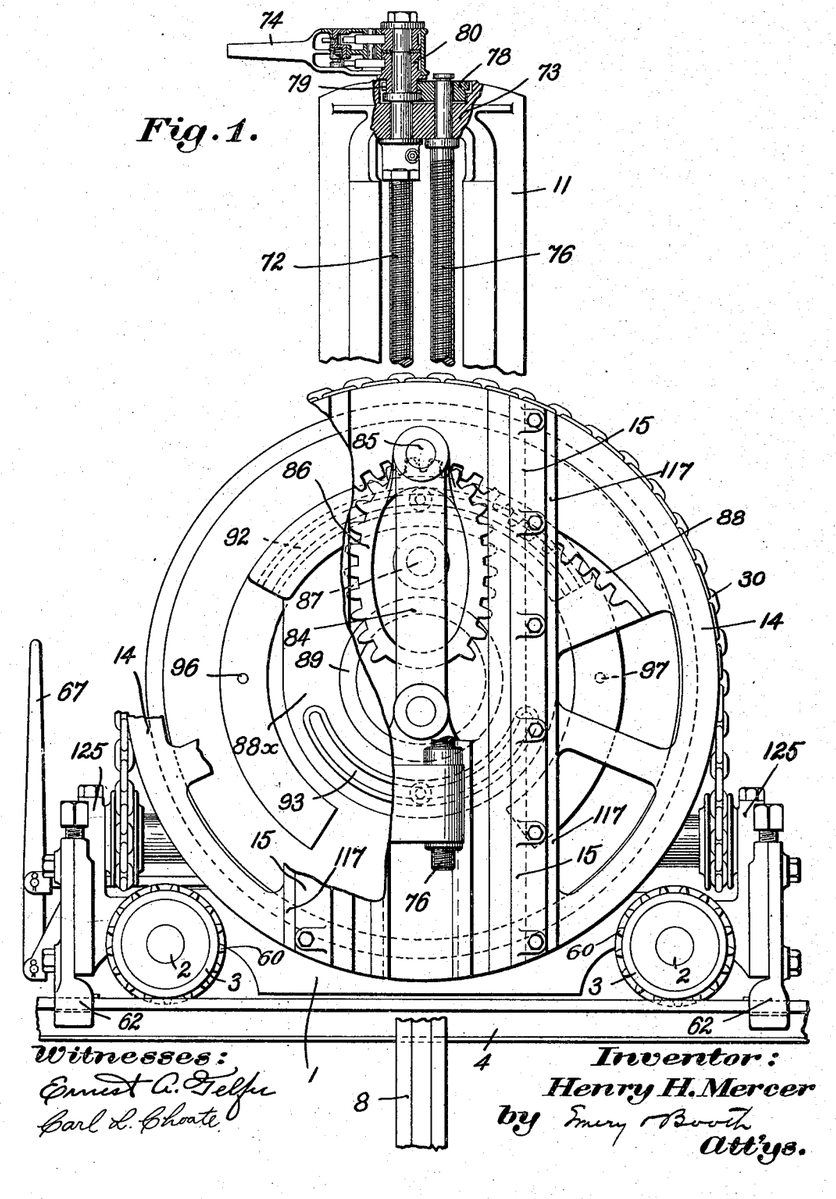
Figure 1 is a front elevation partly broken away and partly in section, showing a stone channeling machine embodying one form of my invention.

At times it may be desirable to hold the carriage fixed, while imparting a swinging movement to the cutting appliances, and for this purpose any suitable means may be provided. Herein for this purpose each front corner of the frame is provided (Fig. 4) with a bracket 61 having a depending portion provided with in-turned gripping fingers 62 adapted to underlie the flanges on the rails. The depending portion is threaded for engagement with the lower portion of a combined jack and binding screw 63, the latter having an upper portion 64 adapted to be gripped between the bracket and the truck frame when the clamp screw 65 is tightened, the upper portion of the bracket (as seen in Fig. 1) comprising half only of the socket for the screw. The rear corners of the machine also are provided with similar depending gripping fingers 62 (Fig. 3) and binding screws 63, these being carried by the bracket 34. The bracket 34 is split where it receives the upper portion 64 of the screw, and the clamping bolt 66 is provided for clamping the same about the screw. During the travel of the carriage, the screws being withdrawn out of contact with the rails, the truck rests upon its wheels and the gripping fingers lie below the rail flanges. When it is desired to fixedly position the machine upon the trackway, the screws 63 may be turned down to engage the rails, lifting the wheels free therefrom and causing the gripping fingers 62 to grip the rail flanges and hold the machine fast to the rails against displacement therefrom.

During circular cutting the engine 47 operates to swing the standard of the tool through the arc of a circle simultaneously with the rapid percussive action of the tool. When the swinging movement has advanced far enough in one direction the reversing rod 56 may be shifted and the swinging movement reversed. While automatic means may be provided for such purpose, herein the rod is shifted by means of the upright hand lever 67 pivoted at 68 upon the frame. Jointed to the hand lever above its pivotal attachment is the forked end of the rod 69, the opposite end of which is jointed to an upright yoke 70, the latter forming part of a sleeve 71 pinned or otherwise secured to the reversing rod so that movement of the hand lever shifts the latter.

As already referred to, the actuator frame is provided with a feeding adjustment toward or away from the work. For this purpose there is provided the usual feed screw 72 passing through the arched portion 73 of the standard and suitably held therein against longitudinal movement while free to be turned by a ratchet lever 74. The lower end of the feed screw has threaded engagement with a split nut 75 (see Figs. 3 and 7) on the actuation frame so that the turning of the screw is adapted adjustably to feed the engine and cutting tools to or from the work.

A second or double adjustment is secured by making the standard adjustable on and relatively to the swinging carrier so that a greatly increased length of cut may be arranged without changing the gang of tools. For this purpose, connection between the standard and the swinging carrier is had by means of a second or auxiliary feed screw 76, which also passes through the arched portion 73 of the standard and is held therein fixedly against longitudinal movement. At its lower end the feed screw 76 has threaded engagement with a nut 77 carried by a part attached to the swinging carrier as will be more fully described. The feed screw 76 may be adjustably turned by any desired means, the same ratchet lever 74 being here used for moving both feed screws 72 and 76. For this purpose the upper end of the feed screw 76 has fixed thereto the gear 78 meshing with a gear 79 carried by the ratchet sleeve 80, which latter is controlled by ratchet handle 74. The particular construction of the ratchet, however, forms no essential part of the present invention and need not be further described since any suitable means may be used for turning the two adjusting screws either independently or together.

The described machine may be caused to travel along a trackway and, with the standard held fixed in an upright position or at some fixed inclination relatively to the work, may be employed to cut the ordinary channel groove in the open. On the other hand it may be clamped fast to the rails, as described, and, by turning the swinging carrier through the driving connections described, the cutting appliances may be given a swinging movement so that the tools are caused to act percussively along the arc of the circle and perpendicularly to the bottom of the channel groove. For example, referring to Fig. 2, the machine may be clamped in the full line position shown and the tool gang caused to make successive channel cuts in the stone along the arcs $a\ b$, $a'\ b'$, etc.

If an arc-shaped channel cut is made in cutting the corner of a channel groove under the overlying side wall of a quarry, as the cut deepens, tools of greater length must be employed and, to carry the cut down for the necessary depth and in under the overhanging wall for the necessary reach, tool gangs must frequently be employed of such unwieldly mass to make them highly objectionable and render the cutting of the machine inefficient.

In the present machine, therefore, I have provided means for imparting to the cutting appliances simultaneously with their periodic swinging movement also a synchronous periodic advancing and receding movement relative to the work, so that the resultant movement is a compound linear and swinging movement resulting in materially extending the line of cut and the reach of the tools.

This may be accomplished by various mechanisms, but herein such a result is secured by advancing and retracting the cutting appliances on the swinging carrier, such movement being preferably so timed with reference to the swinging movement of the carrier that the cutting appliances are projected to the maximum extent at the extreme forward end of the swinging movement and are fully retracted at the end of the back swing. To secure this periodic projection and retraction of the cutting appliances, connections are provided for the standard so that the latter is advanced or retracted along the gibbed ways 15 upon the swinging carrier as the latter is turned back and forth about its trunnion.

This may be accomplished in a variety of ways, but herein the nut 77 with which the feed screw 76 is engaged is carried by a sliding shoe 81 having (Fig. 7) finished webs 82 slidably mounted in suitable grooves 83 formed in the walls of the swinging carrier 14. To reciprocate the sliding shoe and thereby the standard, the former is connected by the link or connecting rod 84 to a crank arm 85. The latter, in turn, is secured to the face of a gear 86, herein elliptical in form and journaled upon a stud 87. The elliptical gear 86 is arranged to mesh with the teeth of an appropriately formed rack 88, the latter carried by the swinging or oscillatory plate 14. As the plate reciprocatively swings it turns the elliptical gear about the journaling stud 87 and causes the reciprocatory advance and retraction of the shoe 81 and the standard 11 with its attached cutting appliances.

This movement of the cutting appliances materially extends the line of cut and the amount of work done by the machine for each swing of the carrier. For example, referring to Fig. 2, and considering the machine clamped to the rails, if periodic advance and retraction of the standard is provided in connection with the swinging movement of the carrier, the line of cut, instead of being along $a\ b$ is along the arc $a\ c$ and along the arc $a'\ c'$ instead of along the arc $a'\ b'$.

Referring to Figs. 1 and 3, it will be seen that the journaling stud 87 for the elliptical gear is fixedly attached to an intermediate, adjustable member, herein comprising the feed plate $88^\times$, mounted to turn about a hub 89 formed by the main support 17. The feed plate is provided with a clamping bolt 90 passing through an aperture in the frame and having threaded engagement with a nut 91 which is movably contained within a T-slot 92 formed in the opposing face of the feed plate. At its opposite (herein the bottom) end the feed plate (Fig. 1) is provided with an arc-shaped slot 93 through which passes, with suitable clearance, (see Fig. 3) the end of a stud 94 carried by and fixedly secured to the oscillating plate 14.

When it is desired to dispense with the swinging movement and utilize the machine with the cutting appliances working at a fixed inclination, not only is the feed plate clamped to the main frame 17 by means of the clamping bolt 90 and its nut 91, but it is also clamped tightly to the swinging plate 14 by means of the stud 94 and its clamping bolt 95, thereby locking the main frame, the feed plate and the carrier all together and in fixed position and preventing the movement of the sliding shoe 81. On the other hand, if it is desired to utilize the swinging movement of the carrier alone, without the linear movement of the standard, the feed plate may be clamped to the carrier and unclamped from the frame 17 so that the feed plate will operate with the carrier and without movement of the elliptical gear or the connecting rod 84.

The utility of the apparatus described is not limited to channel cutting in the bottom of the quarry, but the described machine may be employed for other purposes such as channel cutting in a vertical wall. For this purpose the main frame is provided with additional apertures 96 and 97 (Fig. 1) so positioned that the carrier with the standard and associated parts and the feed plate may be shifted through approximately 90° in either direction, and the feed plate clamped thereat by inserting the clamping bolt 90 through the apertures 96 or 97, the cutting appliances being then presented horizontally at one end of the machine or the other, instead of vertically, and being adapted to carry the line of cut into a vertical wall in just the same manner as described with reference to the quarry bottom in connection with the diagram of Fig. 2.

The described machine can be utilized to elongate still further the line of cut and increase the reach of the cutting tools by causing the machine itself periodically to advance and return synchronously with the swinging movement of the tool carrier. Under these conditions jack screws for lifting the machine are not employed but the machine is allowed to rest upon the trackway and free to travel along the same. When the machine is jacked up free from the rails and the carrier is given its swinging movement, the truck wheels rotate idly out of contact with the rails, but when the machine rests upon the trackway, as described, as soon as the swinging movement is initiated, the machine also starts ahead and travels in that direction toward which the tools are swung.

Figure 2:
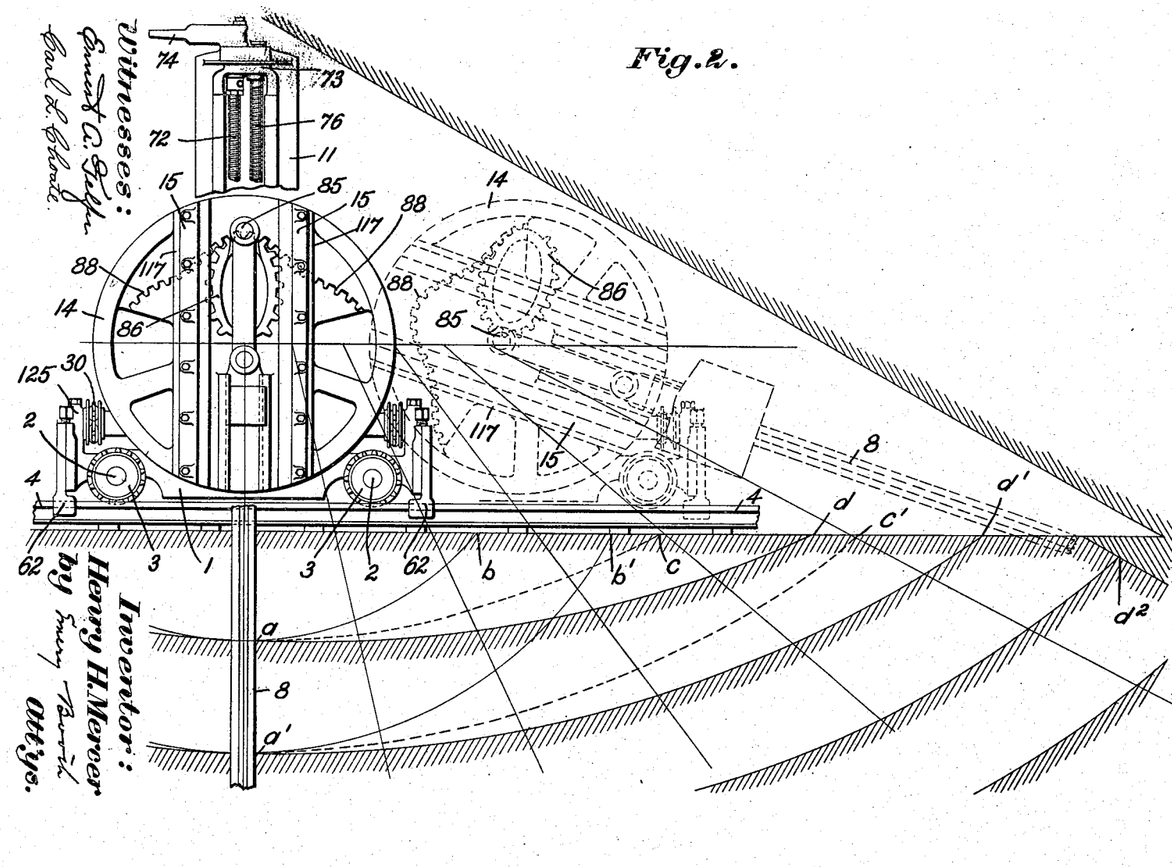
Fig. 2 is an elevation showing the utility of the machine of Fig. 1 when used in corner cutting.

Referring to Fig. 2, the movement of the machine under such conditions will be readily understood. Starting from the full line position shown, the machine will travel toward the dotted line position, the tool or cutting axis passing successively through the positions indicated by the oblique lines. When the swinging movement of the tool carrier reaches its limit and is reversed, the traversing movement of the machine also reverses, and the machine and cutting appliances are returned to the full line position shown, to start a fresh cut.

The described traversing movement of the machine may be used in conjunction with the swinging movement of the tool, either with or without the correspondingly timed reciprocatory linear movement of the standard. In either case the capacity of the machine to reach in under the oblique side wall of the quarry is considerably increased. When employed in conjunction with such linear movement of the standard, the line of cut will be seen to be greatly extended and the capacity of the machine greatly increased for each swing of the tool. For example, referring to Fig. 2, if the tool is adapted to cut along the arc $a\ b$ when swinging from a fixed center, then with the combined linear, synchronous movement of the standard and the synchronous movement of the machine itself, the cut takes place along the line $a\ d$ providing a gain, perhaps 150% for that particular level of cut. At the next level the cut, instead of taking place along the line $a'\ b'$ takes place along the line $a'\ d'$. By this compound movement the machine can be utilized to cut a corner of maximum obliquity with a minimum tool length.

By appropriately proportioning these movements, the flattening or straightening of the curved line of cut can be carried to any desired extent according to the angle at which it is required to do the cutting. In soft stone or coal the bottom of the cut might be kept almost straight. Even in hard stone the tool can be made to strike the bottom of the cut at an angle of considerable obliquity without materially diminishing the efficiency of the machine, since the tool does not glance off from the rock until an angle of approximately 26° is reached.

While I have herein shown one form of my invention embodied in a stone channeling machine and still more specifically in a stone channeling machine intended for corner cutting, I believe that in many respects the movements of the cutting appliances and the mechanism for providing such movements are broadly new and are applicable to machines of widely different construction and intended for different purposes, all of which are within the scope of this invention.

Furthermore, while I have described in detail, for illustrative purposes, the construction of one specific form of machine, it is to be understood that the invention is not limited to the form or relative arrangement of parts or the details of construction, or the specific application made herein thereof, but that extensive deviations may be made from the illustrated embodiment of the invention without departing from the spirit thereof.

Claims:

1. A stone working machine having means carrying cutting appliances, means for reciprocatively oscillating said carrying means and means for automatically synchronously and alternately advancing and retracting said carrying means toward and from the work during said oscillation.

2. A channeling machine having cutting appliances, a carrier therefor, means for reciprocatively oscillating the carrier, and means for automatically actuating the movement of the carrier alternately from and toward the work during said oscillation.

3. A channeling machine having cutting appliances, an oscillating carrier therefor and means dependent on the movement of the carrier for reciprocatively moving the cutting appliances.

4. A channeling machine having cutting appliances, a carrier therefor, a support, means for oscillating the carrier on the support, and means for automatically alternately advancing and retracting the carrier during the oscillation thereof.

5. A channeling machine having percussive cutting appliances, a carrier therefor, a support, means for oscillating the carrier on the support, and means for moving the cutting appliances in unison with said oscillations, said means comprising a driving member having a connection with the support, and with the cutting appliances, and having, also, engagement with said carrier, thereby to communicate movement to the cutting appliances through the oscillating movement of the carrier.

6. A stone working machine having cutting appliances, a carrier, a support, means for oscillating the carrier, means for moving the cutting appliances in unison with the carrier, said means comprising a driving member connected to the cutting appliances and engaged by the carrier to impart movement to the cutting appliances, and a supporting member for said driving member adjustably mounted upon said main support.

7. A stone working machine having cutting appliances, a swinging carrier therefor, a support, means for oscillating the carrier, and means for moving the cutting appliances synchronously with the carrier, said means comprising an elliptical gear connected to the cutting appliances and supported upon said main support and a rack on said carrier, in engagement with said elliptical gear.

8. A stone working machine having cutting appliances, a carrier therefor, means for oscillating the same, means for moving said cutting appliances synchronously with the movement of said carrier, said means comprising a driving member having connection to the cutting appliances, and also to the carrier and a feed plate adjustably mounted on said support with which said driving member also has connection.

9. A stone working machine having cutting appliances, a carrier therefor, a support, means for oscillating said carrier, a sliding member to which said cutting appliances are attached, a driving member having connection to said support and to said carrier and a connection between said driving member and said sliding member to cause the movement of the cutting appliances synchronously with the movement of said carrier.

10. A stone working machine having cutting appliances including a motor for actuating the same, a second motor, means driven by the second motor for swinging the cutting appliances, and means operated by the second motor for advancing and retracting the cutting appliances.

11. A channeling machine having cutting appliances, means for swinging the cutting appliances lengthwise the channel groove, means for advancing and retracting the cutting appliances toward and from the work synchronously with the swinging movement of the cutting appliances, and means for adjusting the cutting appliances to cut vertically or horizontally.

12. A channeling machine having cutting appliances, actuating means therefor, a support for the cutting appliances, and power driven means for periodically advancing and retracting the support bodily relatively to the work.

13. A channeling machine having a percussive tool, actuating means therefor, a support for the tool, and power driven means for periodically advancing and retracting the support bodily toward and from the work.

14. A channeling machine having a tool or tools, a direct acting engine connected thereto, a support for said engine and tools, and means for automatically and periodically advancing and retracting the support bodily toward and from the work.

15. A channeling machine having a truck, cutting appliances, actuating means operating on said cutting appliances for causing the same to cut, a support for said cutting appliances and actuating means, means for automatically and periodically advancing and retracting said support bodily toward and from the work, and means for holding said truck at a fixed position upon its supporting trackway.

16. A stone working machine having cutting appliances, a support therefor, means for adjusting said support toward or from the work, and power driven means for periodically advancing or retracting said support bodily toward or from the work.

17. A stone working machine having a traveling support, cutting appliances, an oscillating carrier, means for oscillating said carrier and cutting appliances, means for alternately advancing and retracting said cutting appliances synchronously with the oscillation of said carrier and means also for synchronously and reciprocatively moving said traveling support.

18. A channeling machine having a truck adapted to run upon a suitable trackway, cutting appliances carried thereby, power driven means upon said truck for oscillating said cutting appliances lengthwise the channel groove, means for synchronously moving said appliances toward and from the cut, and truck driving mechanism for synchronously moving the truck forward and backward along said trackway.

19. A channeling machine having a traveling support, cutting appliances, a motor, connections to said motor to oscillate the cutting appliances, connections to synchronously advance and retract them relatively to the cut and connections to synchronously and reciprocatively move the support along the trackway.

20. A channeling machine having a truck, truck driving mechanism, a main support at the side of the truck, a swinging carrier mounted for swinging movement on said main support, mechanism to swing said carrier, cuttting appliances, an intermediate support between said cutting appliances and said carrier, and means for simultaneously advancing said truck, swinging said carrier, and moving said intermediate support toward the work.

21. A stone working machine having a traveling support, cutting appliances, a swinging carrier therefor, and means for reciprocatively moving the support and reciprocatively swinging the carrier synchronously with the reciprocatory movement of the support.

22. A stone working machine having a traveling support, cutting appliances, and power driven means for reciprocatively swinging the cutting appliances and synchronously reciprocating the support.

23. A stone channeling machine having a movable support, cutting appliances, means for reciprocatively swinging the latter lengthwise the channel groove and means to reciprocate the support also lengthwise the channel groove and synchronously with the swinging of the cutting appliances.

24. A stone channeling machine having a truck, cutting appliances at the side thereof, power driven means for swinging the cutting appliances lengthwise the channel groove and traveling means for automatically advancing and retracting the truck synchronously with the swinging movement.

25. A stone channeling machine having a truck, a main support, a swinging carrier thereon, cutting appliances on said carrier, a motor and connections with the motor for simultaneously driving the truck and swinging the carrier.

26. A stone channeling machine having a truck, a main support, a swinging carrier thereon, cutting appliances on said carrier, a motor, connections with the motor for driving the truck and swinging the carrier, and reversing means between the motor and the truck and carrier.

27. A stone working machine having cutting appliances, a traveling support, means for reciprocatively moving said support and means for automatically advancing and retracting the cutting appliances toward and from the work synchronously with the reciprocations of the support.

28. A stone channeling machine having a traveling support, cutting appliances thereon, means for reciprocatively moving said support lengthwise the channel groove and power driven means for alternately advancing and retracting said cutting appliances synchronously with the reciprocations of the support.

29. A stone working machine having cutting appliances, a support therefor and means for imparting to said support a compound linear and swinging movement while said cutting appliances are cutting a straight channel.

30. A stone working machine having a percussive cutting tool, a support therefor and means for imparting to said support a compound linear and swinging movement, while said percussive cutting tool is cutting a straight channel.

31. A stone channeling machine having a percussive cutting tool adapted to cut a straight channel or groove in the stone, a support for said tool and means for imparting to said support a compound linear and swinging movement lengthwise the channel groove.

32. A stone working machine having cutting appliances, actuating means, a swinging support, means for advancing and retracting the cutting appliances on the support and for reciprocatively swinging the support with each forward movement of the cutting appliances, thereby to provide an extended line of cut.

33. A stone working machine having cutting appliances, actuating means for the cutting appliances, a support for the cutting appliances, means for reciprocatively advancing and retracting the appliances on the support and for reciprocatively swinging the support and advancing and retracting the machine with each advance movement of the cutting appliances, thereby to provide an extended line of cut.

34. A stone working machine having cutting appliances, actuating means, a support, means for reciprocatively advancing the machine and for reciprocatively swinging the support automatically and synchronously with each advancing movement of the machine, thereby to provide an extended line of cut.

35. The combination with a channeling machine having a traveling support, of a trackway on which the same is movable, cutting appliances, a carrier for the latter, automatic means for swinging the carrier lengthwise the channel groove, means for synchronously reciprocating the same toward and from said groove, and interlocking, driving connections between the support and the trackway to advance the machine.

36. A stone working machine having a traveling support, cutting appliances, a swinging carrier therefor, and common automatic means for reciprocatively moving the support and synchronously reciprocating the swinging carrier.

37. A stone working machine having a traveling support, cutting appliances and a single motor for reciprocatively swinging the cutting appliances automatically and synchronously and reciprocatively moving the support.

38. A stone working machine having cutting appliances, actuating means, a swinging support, motor driven means for advancing and retracting the cutting appliances on the support, and motor driven means for reciprocatively swinging the support with each forward movement of the cutting appliances.

39. A stone working machine having cutting appliances, actuating means, a swinging support, motor driven means for reciprocatively advancing and retracting the cutting appliances on the support, motor driven means for reciprocatively swinging the support, and automatic means for advancing and retracting the machine with each advance movement of the cutting appliances.

40. A stone working machine having cutting appliances, actuating means, a swinging support, motor driven means for reciprocatively advancing the machine, and motor driven means for automatically reciprocatively swinging the support with each advancing movement of the machine.

41. A channeling machine having a horizontally traveling support, a cutter, a swinging carrier therefor mounted for swinging movement on the support in a plane lengthwise the channel groove, and means for automatically reciprocatively moving the support and reciprocatively swinging the carrier synchronously with the reciprocatory movement of the support.

42. A channeling machine having a truck adapted to travel along a trackway on the quarry bottom, a channeling tool, an actuating motor therefor, a driving motor for reciprocatively moving the truck, a carrier mounted for swinging movement on the truck in a plane lengthwise the channel groove, and means for atuomatically reciprocatively swinging the carrier synchronously with the reciprocatory movement of the truck.

43. A stone working machine having cutting appliances, a traveling support, means for reciprocatively swinging the cutting appliances on the support, a carrier for said appliances and means for automatically advancing and retracting the carrier to and from the work synchronously with the swinging movement of said appliances.

44. A stone working machine having cutting appliances, a traveling support, means for reciprocatively moving the support, means for automatically advancing and retracting the cutting appliances toward and from the work synchronously with the reciprocations of the support, and means for reciprocatively swinging the cutting appliances on the support also synchronously with the reciprocations of the support.

45. A stone channeling machine having a traveling support, cutting appliances, motor driven means for reciprocatively swinging the cutting appliances on the support and motor driven means for advancing and retracting the cutting appliances toward and from the work synchronously with their swinging movement.

In testimony whereof, I have signed my name to this specification, in the presence of two subscribing witnesses.

HENRY H. MERCER.

Witnesses:
E. J. BRUCHARD,
C. J. JONES.

Copies of this patent may be obtained for five cents each, by addressing the "Commissioner of Patents, Washington, D. C."